April 13, 1926.   1,580,455

J. C. SWAN

METHOD OF COLLECTING AND STORING NATURAL COLD

Filed August 22, 1925

Inventor
John C. Swan.

By  *[signature]*

Attorney

Patented Apr. 13, 1926.

1,580,455

UNITED STATES PATENT OFFICE.

JOHN C. SWAN, OF MARIETTA, OHIO.

METHOD OF COLLECTING AND STORING NATURAL COLD.

Application filed August 22, 1925. Serial No. 51,889.

*To all whom it may concern:*

Be it known that I, JOHN C. SWAN, residing in Marietta, county of Washington, and State of Ohio, and a citizen of the United States, have invented certain new and useful Improvements in Methods of Collecting and Storing Natural Cold, of which the following is a specification, reference being had to the accompanying drawing, forming a part thereof.

My invention relates to a method of collecting and storing natural cold and has for its object to provide a method by which natural atmospheric cold may be utilized to cool a mass of material existing in nature and cause it to serve as a reservoir of cold to be drawn upon as required. A further object of the invention is to provide a method by which a mass of material existing in nature and capable of use as a storage reservoir for cold, may be utilized for such use.

All streams of water carry with the water more or less detritus depending upon the volume and rapidity of fall of the stream and upon other conditions and this detritus is dropped as the flow of the stream lessens in rapidity, the heavier integrals, such as boulders and pebbles, being dropped first and the lighter being carried further. The detritus thus dropped tends to fill the original bed of the stream so that in course of years the original channel may be filled to a depth of several hundreds of feet with the only visible stream flowing in a channel on the surface of the mass of detritus. The detritus, however, does not form a solid mass but affords spaces between the integrals forming it, leaving voids into which water percolates, and this water flows with the surface stream but necessarily at a very much slower rate because of the obstructions presented by the detritus; the flow observed in certain cases being less than one foot a day.

Where the water of a stream is drawn off for irrigation purposes as in the arid and semiarid regions of western and southwestern portions of the United States only about 15 per cent of the water is taken up by the soil and vegetation and about 85 per cent seeps back into the stream much of it sinking into the bed of detritus and contributing to the under flow through the detritus. The seepage water having been exposed in the irrigation ditches and upon the hot soil to the sun and earth, heat returns to the stream at a relatively high temperature often above 100° F. and, entering and flowing through the bed of detritus gradually heats its solid material with the result that the water in beds of detritus may be at a temperature of above 80° F. when the atmospheric temperature in the winter season may be below freezing. The solid material constituting the detritus being of high specific weight, when once heated by the warm seepage water holds a great heat quantity for a long time and it is equally true that if cooled to a low temperature it will remain cool for a long time and will cool the water in the interstices of the integrals of which it is made up, whether the water is flowing or its flow is checked or stopped.

By my invention the bodies of detritus are made use of as a storage reservoir of cold and natural atmospheric cold is utilized to cool them to the desired temperature, my invention including also the use of atmospheric cold to produce in a naturally existing pond or lake of water a storage reservoir of cold as a solid body of ice of substantially greater thickness than would be produced by surface freezing.

With the objects above set forth, and other objects hereinafter explained in view my invention consists in the method hereinafter described and claimed.

Referring to the drawings.

Figure 1:
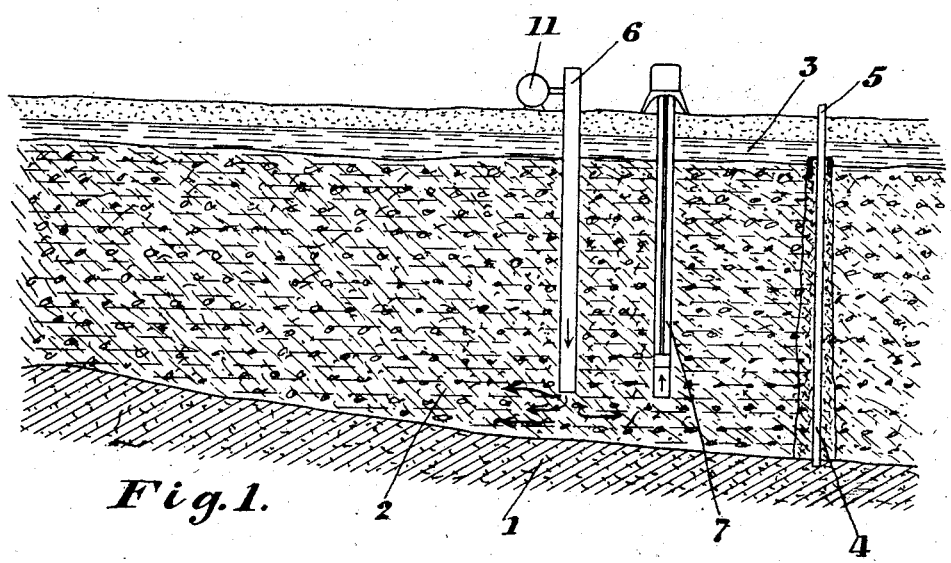
Figure 1 is a longitudinal vertical sectional view of an artificially formed reservoir adapted to be made use of in my method.
Figure 2:
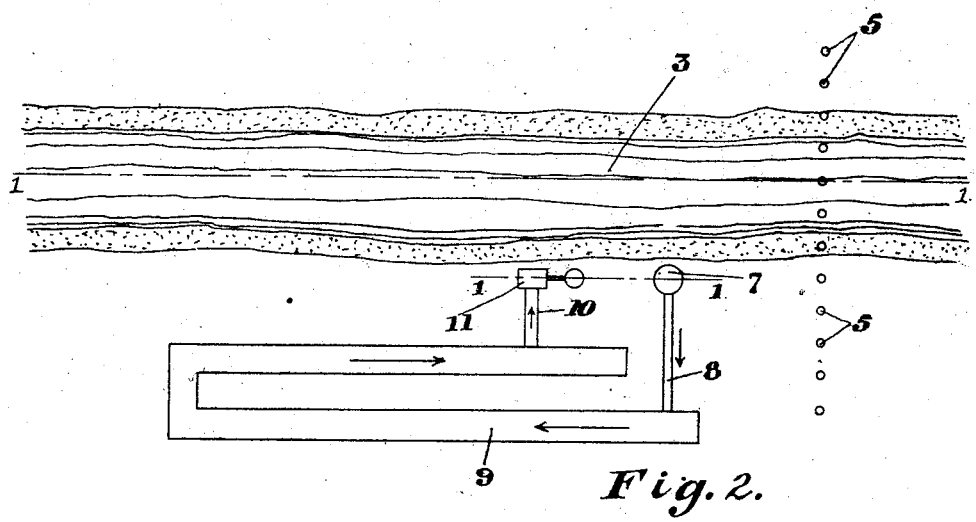
Figure 2 is a plan view of the reservoir shown in Figure 1 showing also means for cooling water by exposing it to atmospheric cold.

In the drawings which are to be understood as diagrammatic only and are not intended to limit the invention to the use of apparatus shown or to the arrangement thereof shown, 1 indicates the impervious stratum of rock or clay which underlies a subterranean stream flowing through a body of detritus 2, consisting of boulders, gravel and sand with possibly more or less clay in bodies or mixed with the gravel. 3 indicates the surface stream flowing in a relatively shallow channel in the upper surface of the bed of detritus 2.

The flow of water in the surface streams will depend upon the drop in level towards the mouth of the stream and may be very rapid. The underflow, or flow of water below the surface while dependent also upon the drop in level towards the mouth of the stream is necessarily slow because of the fact that the water has to find its way through interstices or voids between the boulders, particles of gravel and particles of sand. At the same time, because of the depth and lateral extent of the body of detritus 2 the volume of the underflow may be and often is very much greater than that of the surface stream.

The channel which is filled with detritus 2 may be assumed to have been at one time the channel of a stream, perhaps a great river, originally open to the atmosphere, which has been filled too near the surface of the ground by material brought down from a higher level by erosion. As the bottom of the channel must be assumed to be more or less irregular water sinking into the body of detritus will fill and remain in depressions up to the level of the ledge or other natural obstruction at the down stream end of the depression, thus forming a body of detritus containing a more or less large body of water in the interstices or spaces between the masses or particles of solid material. When such a body of detritus beneath the surface of the ground exists it may be made use of as the storage reservoir.

Ordinarily, and even though such a natural body of detritus is found, it is desirable to obstruct the flow of the under ground stream through it, and I preferably use as such obstruction a subterranean dam 4 formed as described in my application for Letters Patent of the United States filed August 26, 1925, Serial No. 52,583, by introducing a refrigerating medium into a series of wells 5 drilled in a line across the stream, and thereby freezing the water on each side of the row of wells so as to form a subterranean ice dam stopping the under flow and forming above the dam what corresponds to a mill pond which may back up the water for a long distance. The mill pond thus formed may be supplemental to the natural pool or pond above described or it may not, depending upon the natural conditions, it being essential only that the flow of water in the under ground stream be so stopped or checked as to cause the body of detritus above it to hold the water contained in it, or introduced into it practically without such surface flow.

Into the body of detritus whether the flow of water through it is checked naturally or artificially, I drill one or more wells 6 of any convenient diameter, preferably 20 inches, extending to near, though not to, bed rock, and into the well or wells 6 I force cooled water preferably near its freezing point. The water for this purpose may be obtained from any convenient source but is preferably drawn from the water of the pool or pond, as by pumping it from a well 7 drilled through the body of detritus, and led by pipe 8 to an open trough 9 in which it is cooled by exposure to the atmosphere when the atmospheric temperature is down to a temperature materially below that of the water in the body of the detritus. The cooling trough 9 may be a shallow pond or may be a ditch or mere furrow in the ground, it being essential only that it afford sufficient area to permit the water passing through it to be acted upon by the atmospheric temperature sufficiently to cool it to as near the atmospheric temperature as possible without congealing it.

The water thus cooled passes from the trough 9 through means by pipe 10, through a force pump 11 to the well 6. The force pump 11 is needed only to give a slight pressure, and if the trough 9 is located 4 or 5 feet above the level of the surface of the surface stream the pump may be dispensed with. The water thus cooled is discharged from the bottom of well 6 and being heavier than the warmer water in the body of detritus displaces it upward with the result that the warmer water is displaced from the dam upward for a distance depending only on the length of time that the operation is continued, and the continuance of cold weather, and at the same time the solid detritus material is cooled to the temperature of the cooled water introdruced.

When the summer heat is over and the atmospheric temperature falls to about 40° F. the operation of cooling water in the trough 9 may be begun and the water cooled to this temperature introduced through well 6 into the body of detritus. The water thus cooled may be drawn from the body of detritus but may be drawn from the surface stream at a higher lever or may be drawn from another stream at a level sufficiently above the level of the surface of the body of detritus at a slight pressure. By thus drawing the water by gravity the operation may be conducted without expense for pumping.

As the atmospheric temperature falls below 40° F. the water introduced into the body of detritus will be still cooler and when the atmospheric temperature falls below 32° F. it will be necessary to keep the water moving in the trough 9 sufficiently to prevent its freezing. It is, of course, desirable to have the water introduced into the body of detritus as near 32° F. as possible.

It is of course to be understood that a large body of detritus having a temperature approximately 80° F. will be cooled slowly and that it may require continuation of the operation of introducing cooled water throughout the entire winter season but as, if the water to be cooled is supplied by gravity, no expenditure of effort other than to see that the water supplied is not frozen, is required. The result at the end of the winter season is a body of detritus of great extent cooled to near the freezing point with the interstices of the integrals composing it filled with water also at near the freezing point. This water may be drawn upon as desired. For use in the condenser of a power plant this cooled water will be of great commercial value in increasing the power output, and, of course, its value for many other purposes will be readily understood.

As the already cooled water is drawn out other water at such temperature as it may have will be introduced into the body of detritus and its heat absorbed by the cooled solid material and cooled to approximately the freezing temperature. The body of detritus once cooled to near the freezing point will be as slow to become heated as it was to become cooled and may be expected to serve as an effective storage of cold through the summer season.

While ordinarily the body of detritus will be found nearly or quite to the surface with water a body of detritus which is only partly filled with water or may contain little or no water, may be used as a storage reservoir of cold, the cooled water as introduced into it acting, at first, directly upon the solid matter.

The method of my invention may be made use of where the natural body to be utilized as the storage reservoir for cold is a body of water such as a pond or lake. During the season of low atmospheric temperatures as the surface water becomes chilled by atmospheric cold it becomes heavier than the unchilled water below it, at least until chilled below 39° F., and tends to sink displacing the warmer water below it and permitting the warmer water to rise to the surface to be itself chilled by exposure to the atmospheric cold. The water for a considerable depth below the surface is thus chilled to approximately the atmospheric temperature. When the atmospheric temperature falls materially below 39° F. the surface water chilled below this temperature expands and does not sink and when the atmospheric temperature falls materially below 32° F. ice is formed at the surface gradually extending below the surface the depth to which freezing extends being limited by the insulation afforded by the ice already formed and the fact that the water below the surface though chilled to approximately 39° F., as above described, remains normally above the freezing point until by contact with the surface ice is further chilled and frozen gradually and to a limited depth only even by long continued extremely low atmospheric temperature. By supplying to the pond or lake water chilled by exposure to atmospheric cold the volume of water chilled to or nearly to the freezing point may be greatly increased so that formation of ice from the surface downward will be facilitated and ice of more than normal thickness will be formed by downward freezing, and, after ice has been formed at the surface, additional layers of ice may be formed by the action of atmospheric cold above the surface ice first formed so that with the long continued low atmospheric temperatures not unusual in some parts of the United States, ponds or lakes may be frozen to their bottoms, though many feet in depth, to thus form solid masses of ice of such extent as to serve effectively as storage reservoirs of cold throughout a long summer season.

In carrying out my invention as applied to ponds or lakes, when the atmospheric temperature, as the winter season approaches, falls to about 40° F. water drawn from any convenient source, preferably from near the bottom of the pond or lake itself, is chilled to approximately the atmospheric temperature by exposure in shallow troughs as above described or, preferably by distributing it over the surface of the pond or lake. The water thus supplied at the temperature to which it is chilled by the atmospheric cold increases the volume, at and near the surface, of water chilled to such temperature and requiring to be further chilled only through a few degrees to be down to the freezing point. When the atmospheric temperature drops below 32° F. and ice is formed at the surface the freezing below the surface is more rapid and extends to a greater depth than it would if the chilled water were not supplied.

After ice is formed at the surface the supply of water is continued and is readily distributed on the surface of the ice to be chilled and frozen to form a layer of ice overlying the ice first formed. By continuing the supply of water, the atmospheric temperature continuing below 32° F., overlying layers of ice may be formed of such thickness that their weight will cause the ice first formed to sink eventually to the bottom, the sinking of the ice being facilitated by the withdrawal of water from below it.

Having thus described my invention what I claim is:—

1. A method of collecting and storing cold, which consists in introducing relatively cold water into a subterranean body of detritus consisting of integrals of solid material with voids between them adapted to contain water, and continuing to introduce the cold water until the temperature of the solid material is reduced materially below its initial temperature.

2. A method of collecting and storing cold, which consists in introducing relatively cold water into a subterranean body of detritus having the voids between the integrals of solid material composing it filled with relatively warm water, and continuing to introduce the cold water until the warm water is displaced and the solid material is cooled substantially below its initial temperature.

3. A method of collecting and storing natural cold, which consists in cooling water by exposing it to atmospheric temperature when the atmospheric temperature is below 40° F. and introducing the water so cooled into a subterranean body of detritus consisting of integrals of solid material with voids between them adapted to contain water, and continuing to introduce the water so cooled until the temperature of the solid material is reduced substantially below its initial temperature.

4. A method of collecting and storing natural cold, which consists in cooling water by exposing it to atmospheric temperature when the atmospheric temperature is below 40° F. and introducing the water so cooled into a subterranean body of detritus consisting of integrals of solid material with voids between them filled with relatively warm water, and continuing to introduce the water so cooled until the warm water is displaced and the solid material is cooled substantially below its initial temperature.

5. A method of collecting and storing cold, which consists in drawing water from a subterranean body of detritus consisting of integrals of solid material having relatively warm water in the voids between the integrals, cooling the water so drawn from the body of detritus and introducing it into the body of detritus and continuing to draw water from the body of detritus, cool it and return it to the body of detritus until the warm water is displaced and the temperature of the solid material is reduced substantially below its initial temperature.

6. A method of collecting and storing cold, which consists in drawing water from a subterranean body of detritus consisting of integrals of solid material having relatively warm water in the voids between the integrals, cooling the water by exposing it to atmospheric temperature when the temperature is below 40° F., introducing the water so cooled into the body of detritus, and continuing to draw water from the body of detritus, cool it by exposure to atmospheric temperature and return it to the body of detritus until the relatively warm water is displaced and the solid material is cooled substantially below its initial temperature.

7. A method of collecting and storing cold, which consists in damming the underflow through a subterranean body of detritus consisting of integrals of solid material having the voids between them filled with water to form a reservoir capable of containing water, introducing relatively cold water into the reservoir thus formed to displace the water initially contained therein and continuing to introduce relatively cold into the reservoir until the solid material of the body of detritus is cooled substantialy below its initial temperature.

8. A method of collecting and storing cold, which consists in maintaining a supply of water by gravity to a subterranean body of detritus consisting of integrals of solid material with voids between them adapted to contain water, cooling the water so supplied in its passage to the body of detritus, and continuing to supply the cold water to the body of detritus until the warm water contained in the body of detritus is displaced and the solid material is cooled substantially below its initial temperature.

In testimony whereof, I hereunto affix my signature.

JOHN C. SWAN.